(12) United States Patent
Sankar et al.

(10) Patent No.: US 9,992,705 B2
(45) Date of Patent: Jun. 5, 2018

(54) WI-FI CALLING QUALITY OF SERVICE ON TRUSTED WLAN NETWORKS

(71) Applicant: Cisco Technology, Inc., San Jose, CA (US)

(72) Inventors: Mantha Ravi Sankar, Bangalore (IN); Sandeep Dasgupta, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 306 days.

(21) Appl. No.: 14/885,273

(22) Filed: Oct. 16, 2015

(65) Prior Publication Data

US 2017/0111826 A1 Apr. 20, 2017

(51) Int. Cl.
*H04W 28/20* (2009.01)
*H04W 72/04* (2009.01)
(Continued)

(52) U.S. Cl.
CPC .......... *H04W 28/20* (2013.01); *H04W 40/12* (2013.01); *H04W 72/042* (2013.01); *H04W 72/0413* (2013.01); *H04W 84/12* (2013.01)

(58) Field of Classification Search
CPC ...... H04W 28/20; H04W 28/08; H04W 84/12
See application file for complete search history.

(56) References Cited

U.S. PATENT DOCUMENTS

2012/0263041 A1* 10/2012 Giaretta .............. H04L 47/2441
370/236
2012/0287784 A1 11/2012 Shatzkamer et al.
(Continued)

FOREIGN PATENT DOCUMENTS

WO 2013/134669 A1 9/2013
WO 2014/177470 A1 11/2014
(Continued)

OTHER PUBLICATIONS

"Carrier Wi-Fi Guidelines", The WBA Vision, Wireless Broadband Alliance, www.wballiance.com, Carrier Wi-Fi Working Group, Version 0.30, Feb. 7, 2014, 65 pages.
(Continued)

*Primary Examiner* — Omer S Mian
(74) *Attorney, Agent, or Firm* — Edell, Shapiro & Finnan, LLC

(57) ABSTRACT

Techniques are presented that ensure Quality of Service (QoS) for Wi-Fi® calling and other Internet Media Services (IMS) when a user connects from a carrier-operated public Wi-Fi network to an IMS. A first packet including a domain name system (DNS) request received from a wireless mobile device via an access point is intercepted at a networking device. A network address of a collocated gateway device associated with the networking device is sent to the wireless mobile device in response to the DNS request. A second packet is received from the wireless mobile device including the network address of the collocated gateway to establish a network communication via the collocated gateway device. First QoS parameters associated with the network communication are received from the collocated gateway device and a notification message is sent to the access point, the notification message including the first QoS parameters.

20 Claims, 9 Drawing Sheets

(51) Int. Cl.
*H04W 40/12* (2009.01)
*H04W 84/12* (2009.01)

(56) References Cited

U.S. PATENT DOCUMENTS

2013/0121194 A1    5/2013  Heshmati
2013/0287005 A1*  10/2013  Sarikaya ........... H04L 29/12066
                                                                  370/331
2014/0213219 A1    7/2014  Mohebbi
2015/0373617 A1*  12/2015  Cho ..................... H04W 40/12
                                                                  370/329

FOREIGN PATENT DOCUMENTS

WO    2015/038911 A1   3/2015
WO    2015/039096 A1   3/2015

OTHER PUBLICATIONS

"Wi-Fi Calling and the Support of IMS Services over Carrier Wi-Fi Networks", White Paper, C11-733136-00, Oct. 2014, www.cisco.co/go/spwifi, 8 pages.

"3rd Generation Partnership Project; Technical Specification Group Services and System Aspects; 3GPP system-fixed broadband access network interworking; Stage 2" (Release 11), Technical Specification, 3GPP TS 23.139, V11.3.0, www.3gpp.org, Dec. 2012, 88 pages.

J. Kaippallimalil et al., "Mapping 802.11 QoS in a PMIPv6 Mobility Domain" Internet Draft, Cisco, Feb. 10, 2014, 24 pages.

* cited by examiner

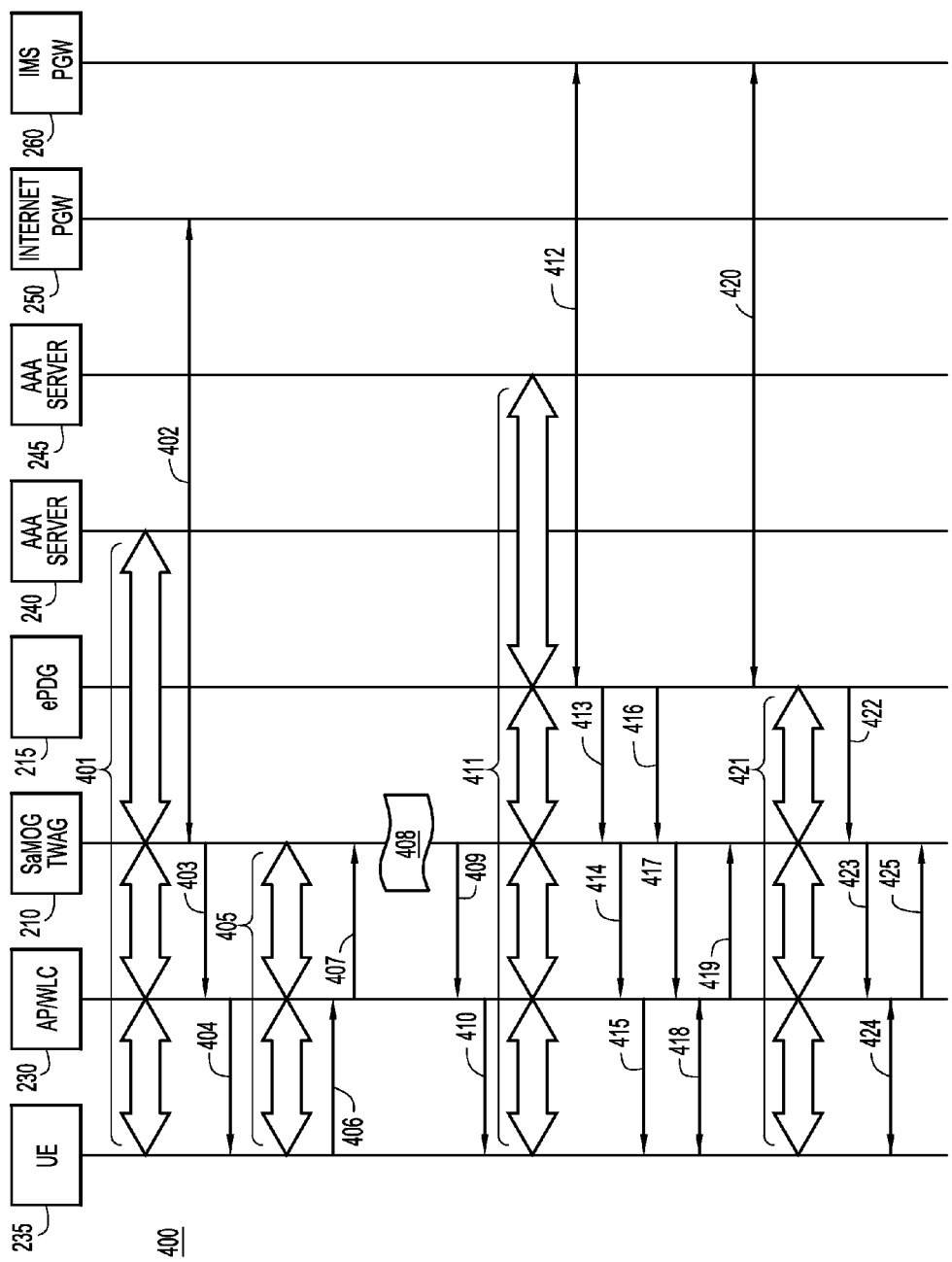

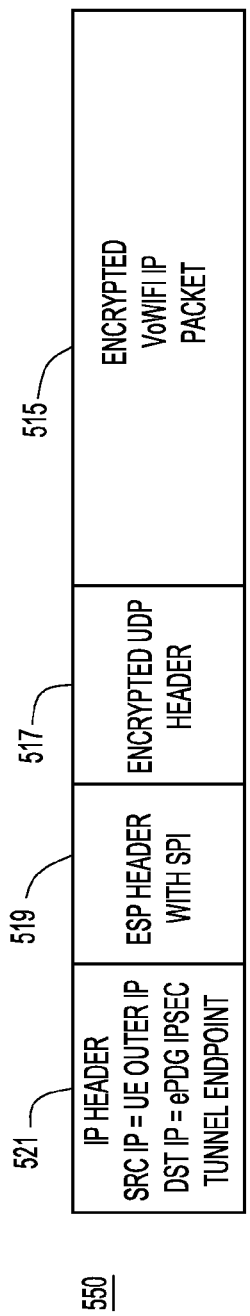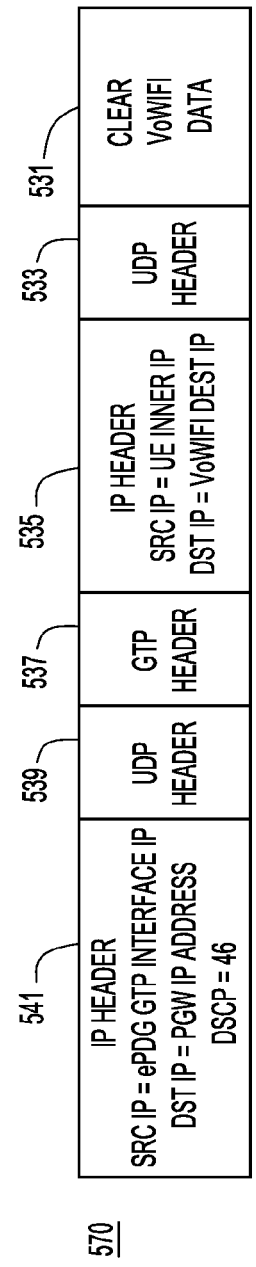

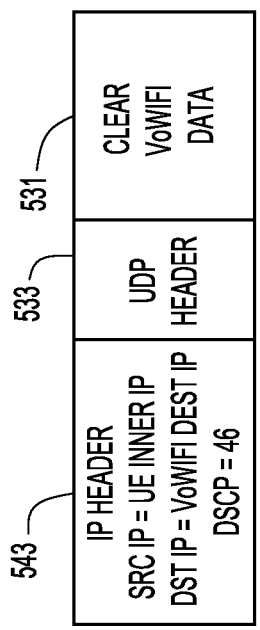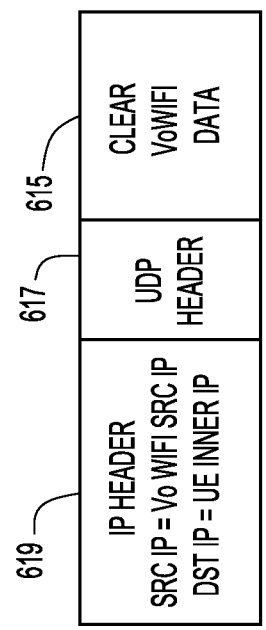

WI-FI CALLING QUALITY OF SERVICE ON TRUSTED WLAN NETWORKS

TECHNICAL FIELD

The present disclosure relates to mobile multimedia communications through wireless local area networks.

BACKGROUND

Mobile telecommunications service providers increasingly use Wi-Fi® networks to offload carrier based network traffic using Internet protocol multimedia services (IMS) such as Wi-Fi calling or Voice over Wi-Fi (VoWi-Fi) services. Wi-Fi networks can be operated by the mobile telecommunications service providers (carrier-operated public Wi-Fi networks) or by independent network operators (e.g., home and enterprise Wi-Fi networks). From a data traffic point of view, Wi-Fi networks can be classified as trusted and untrusted Wi-Fi networks.

Wi-Fi calling or Voice over Wi-Fi (VoWi-Fi) services may use 3rd Generation Partnership Project (3GPP) untrusted wireless local area network (WLAN) access integration to the evolved packet core (EPC) network. The 3GPP untrusted WLAN access integration uses evolved packet data gateway (ePDG) devices for access to the EPC from WLAN or Wi-Fi networks.

From a network operator perspective, a carrier-operated public Wi-Fi network can be classified as a trusted WLAN access network because the same network operator controls the Wi-Fi network and the 3GPP network. However, from a VoWi-Fi enabled device's perspective, all non-3GPP access networks including any type of WLAN such as home, enterprise and carrier-operated public Wi-Fi networks are untrusted and insecure Communication via untrusted and insecure WLANs is typically encrypted and a Quality of Service (QoS) cannot be guaranteed.

BRIEF DESCRIPTION OF THE DRAWINGS

FIG. 4 is a sequence diagram depicting a sequence of messages exchanged on a control plane level in the networking system according to an example embodiment.

FIG. 5C is a diagram illustrating an uplink packet which is forwarded from the SaMOG TWAG to an ePDG according to an example embodiment.

FIG. 5D is a diagram illustrating an uplink packet transmitted by the ePDG to an IMS Internet packet data network gateway (IMS PGW) according to an example embodiment.

FIG. 5E is a diagram illustrating an uplink VoWi-Fi packet created by the IMS PGW and forwarded to the IMS core according to an example embodiment.

FIG. 6A is a diagram illustrating a downlink VoWi-Fi packet received by the IMS PGW from the IMS core according to an example embodiment.

DESCRIPTION OF EXAMPLE EMBODIMENTS

Overview

Techniques are presented herein that ensure QoS for Wi-Fi calling and other IMS when a user connects from a carrier-operated public Wi-Fi network to an IMS core in a network environment in which carrier-operated public Wi-Fi network and Wi-Fi calling based 3GPP untrusted EPC integration co-exist. A first packet including a Domain Name System (DNS) request received from a wireless mobile device via an access point is intercepted at a networking device. A network address of a collocated gateway device associated with the networking device is sent to the wireless mobile device in response to the DNS request. A second packet is received from the wireless mobile device including the network address of the collocated gateway device to establish a network communication via the collocated gateway device. First QoS parameters associated with the network communication are received from the collocated gateway device and a notification message is sent to the access point, the notification message including the first QoS parameters.

Example Embodiments

The General Packet Radio Service Tunneling Protocol (GTP) is a tunneling protocol defined by the 3GPP standards to carry General Packet Radio Service (GPRS) within 3G or 4G Long Term Evolution (LTE) networks. SaMOG stands for "S2a Mobility based on GTP." SaMOG provides an interface (the 3GPP S2a GTP interface) based on GTP to implement a TWAG between mobile packet core networks and a trusted WLAN access network.

End-to-end Quality of Service (QoS) cannot be guaranteed when Wi-Fi calling takes place over untrusted WLAN networks, e.g., over home or enterprise networks, because of independent network segments in the untrusted WLAN network that are not controlled by the mobile telecommunications service providers.

In addition, in a hybrid approach, Wi-Fi calling is enabled in carrier-operated Wi-Fi networks, which allow simultaneous support of Wi-Fi calling flows and non-Wi-Fi calling flows. As a result, in the hybrid approach, carrier-operated Wi-Fi networks and Wi-Fi calling based on untrusted EPC integration co-exist. The hybrid approach is necessary because current user equipment can connect only to one service set identifier (SSID), i.e., to one unique WLAN at a time. Therefore, if a service provider wants to support Internet communication via an access point name (APN) gateway on SaMOG and Wi-Fi calling via carrier-operated Wi-Fi networks, the hybrid approach is the only feasible option. However, there is no mechanism for guaranteeing QoS for calls via Wi-Fi networks and Wi-Fi calling based on untrusted EPC integration in the hybrid approach.

Although carrier-operated Wi-Fi networks use trusted WLAN integration models, such as models using SaMOG in which a TWAG and/or a trusted WLAN access points (TWAP) provide connectivity from the carrier-operated public Wi-Fi networks to the EPC core, currently there is no mechanism to provide QoS for Wi-Fi calling or other IMS via SaMOG.

Figure 1:
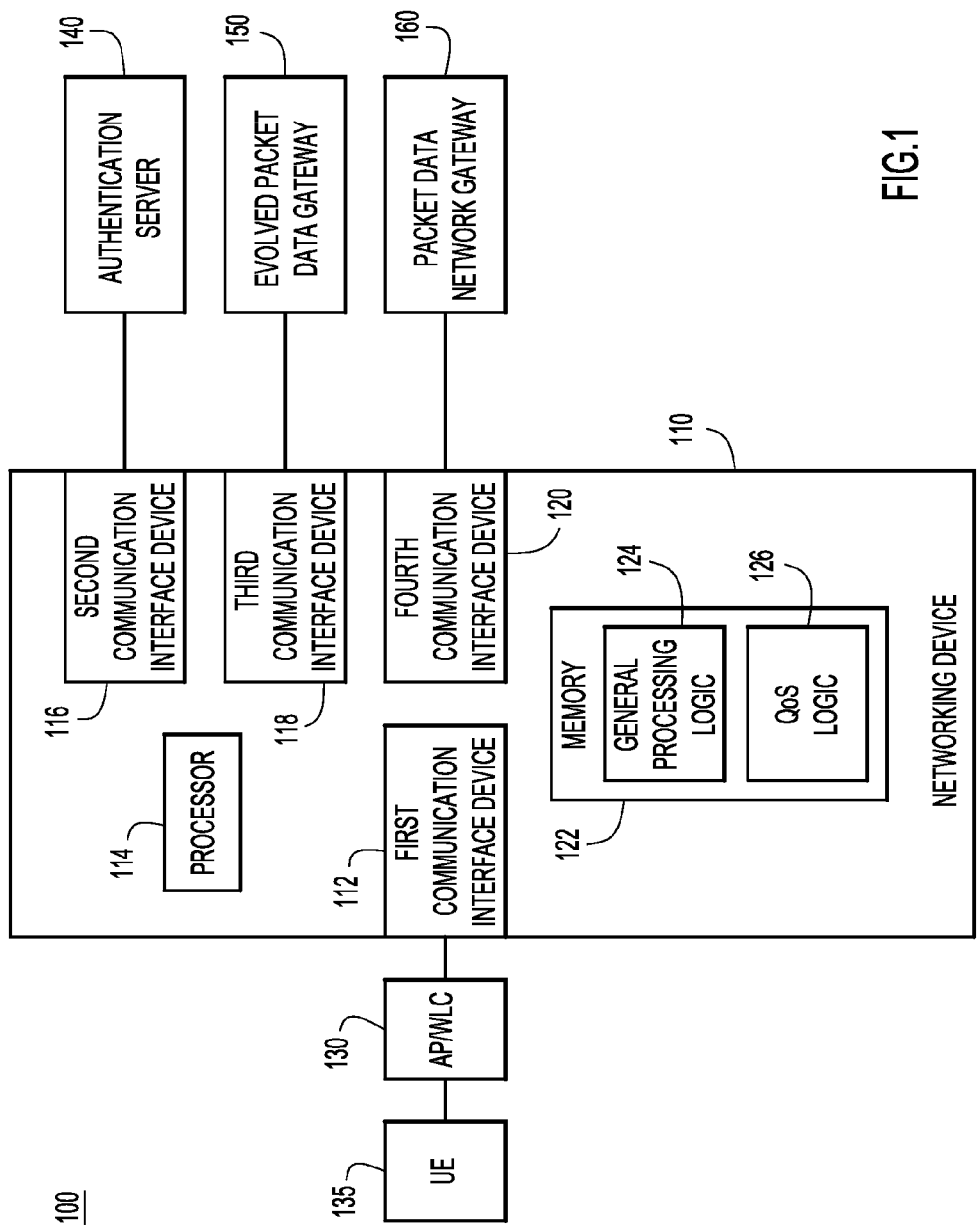
FIG. 1 is a block diagram illustrating a networking system in which methods presented herein ensure QoS for Wi-Fi calling and other Internet Media Services (IMS) may be employed according to an example embodiment.

FIG. 1 is a block diagram illustrating a networking system 100 in which techniques presented herein may be employed and in which QoS for Wi-Fi calling and other IMS is ensured when a user connects from a carrier-operated public Wi-Fi network to an IMS core. Networking system 100 includes networking device 110. Networking device 110 includes a processor 114, first, second, third and fourth communication interface devices 112, 116, 118 and 120, and memory 122 on which general process logic 124 and QoS logic 126 reside. Networking device 110 is connected to AP/WLC 130 via first communication interface 112.

General processing logic 124 is software that enables networking device 110 to connect to AP/WLC 130 of a WLAN to which UE 135 is wirelessly associated/connected. In addition, general processing logic 124 enables networking device 110 to connect to authentication server 140, evolved packet data gateway (ePDG) 150, and packet data network gateway 160, as shown in FIG. 1. QoS logic 126 enables the networking device to perform the operations described in detail below with regard to FIGS. 3 and 4 to ensure end-to-end QoS for Wi-Fi calling or other IMS via networking device 110.

FIG. 1 shows that authentication server 140 is connected to networking device 110 via second communication interface 116, that evolved packet data gateway (ePDG) 150 is connected to networking device 110 via third communication interface device 118, and that packet data network gateway 160 is connected to networking device 110 via fourth communication interface device 120. Although FIG. 1 shows separate communication interface devices for each of the AP/WLC 130, the authentication server 140, the evolved packet data gateway 150, and the packet data network gateway 160, networking system 100 is not limited to such a configuration. Instead, AP/WLC 130, authentication server 140, evolved packet data gateway 150, and packet data network gateway 160, or subsets of these devices, may be connected to networking device 110 via a single communication interface (not shown) which is configured to communicate with the AP/WLC 130, the authentication server 140, the evolved packet data gateway 150, and the packet data network gateway 160 using various communication protocols utilized to employ the techniques presented herein for ensuring QoS for Wi-Fi calling and other IMS in the networking system 100. These communication protocols are further discussed with regard to FIG. 2. For example, the communication interface devices 112, 116, 118 and 120 may be arbitrary network ports of networking device 110.

Memory 122 may be read only memory (ROM), random access memory (RAM), magnetic disk storage media devices, optical storage media devices, flash memory devices, electrical, optical, or other physical/tangible memory storage devices. Thus, in general, memory 122 may include one or more tangible (non-transitory) computer readable storage media (e.g., a memory device) encoded with software comprising computer executable instructions and when the software is executed (by the processor 114) it is operable to perform the operations described herein. In particular, networking device 110 performs the operations described in connection with FIGS. 3 and 4 when executing the software stored in memory 122.

Figure 2:
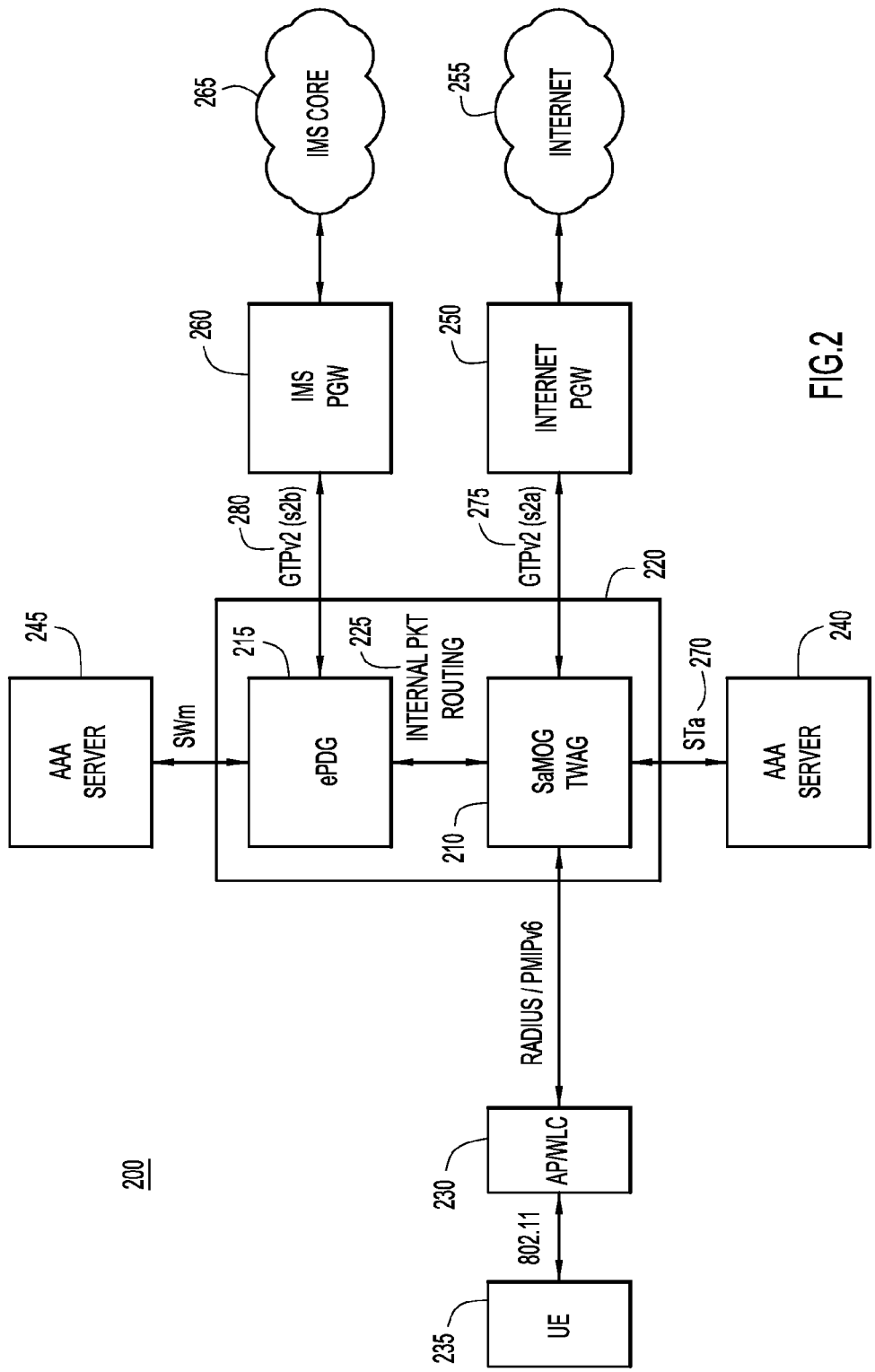
FIG. 2 is a block diagram illustrating a networking system and communication protocols used in conjunction with the methods for ensuring QoS for Wi-Fi calling and other IMS presented herein according to an example embodiment.

Reference is now made to FIG. 2. FIG. 2 is a block diagram illustrating networking system 200 and various communication protocols used in conjunction with the methods for ensuring QoS for Wi-Fi calling and other IMS presented herein. More specifically, networking system 200 includes SaMOG TWAG 210 which corresponds to networking device 110 in FIG. 1, and collocated ePDG 215 which corresponds to evolved packet data gateway 150 in FIG. 1. SaMOG TWAG 210 and ePDG 215 can be implemented in one physical device such as in line card 220 residing in the same chassis. SaMOG TWAG 210 and ePDG 215 can also be implemented in separate physical devices and in separate locations. SaMOG TWAG 210 and ePDG 215 communicate with each other using internal packet routing protocol 225.

Networking system 200 further includes AP/WLC 230 which corresponds to AP/WLC 130 in FIG. 1, UE 235 which corresponds to UE 135 in FIG. 1, authentication, authorization, and accounting (AAA) server 240 which corresponds to authentication server 140 in FIG. 1, AAA server 245 to which ePDG 215 is connected, PGW 250 which corresponds to packet data network gateway 160 in FIG. 1 and which is connected to Internet 255, and IMS PGW 260 which is connected to IMS core 265.

As explained in further detail below, AAA servers 240 and 245 generally provide services for controlling access to networking system 200, for enforcing policies, auditing usage and providing information necessary to bill for services.

Various protocols are utilized for communications between the devices included in networking system 200. For example, SaMOG TWAG 210 and AP/WLC 230 exchange messages in accordance with the Proxy Mobile IPv6 (PMIPv6) protocol, which is a network-based mobility management protocol standardized by the Internet Engineering Task Force (IETF). UE 235 communicates with AP/WLC 230 in accordance with Institute of Electrical and Electronics Engineers (IEEE) 801.11 standards that govern wireless networking transmission methods.

Figure 3:
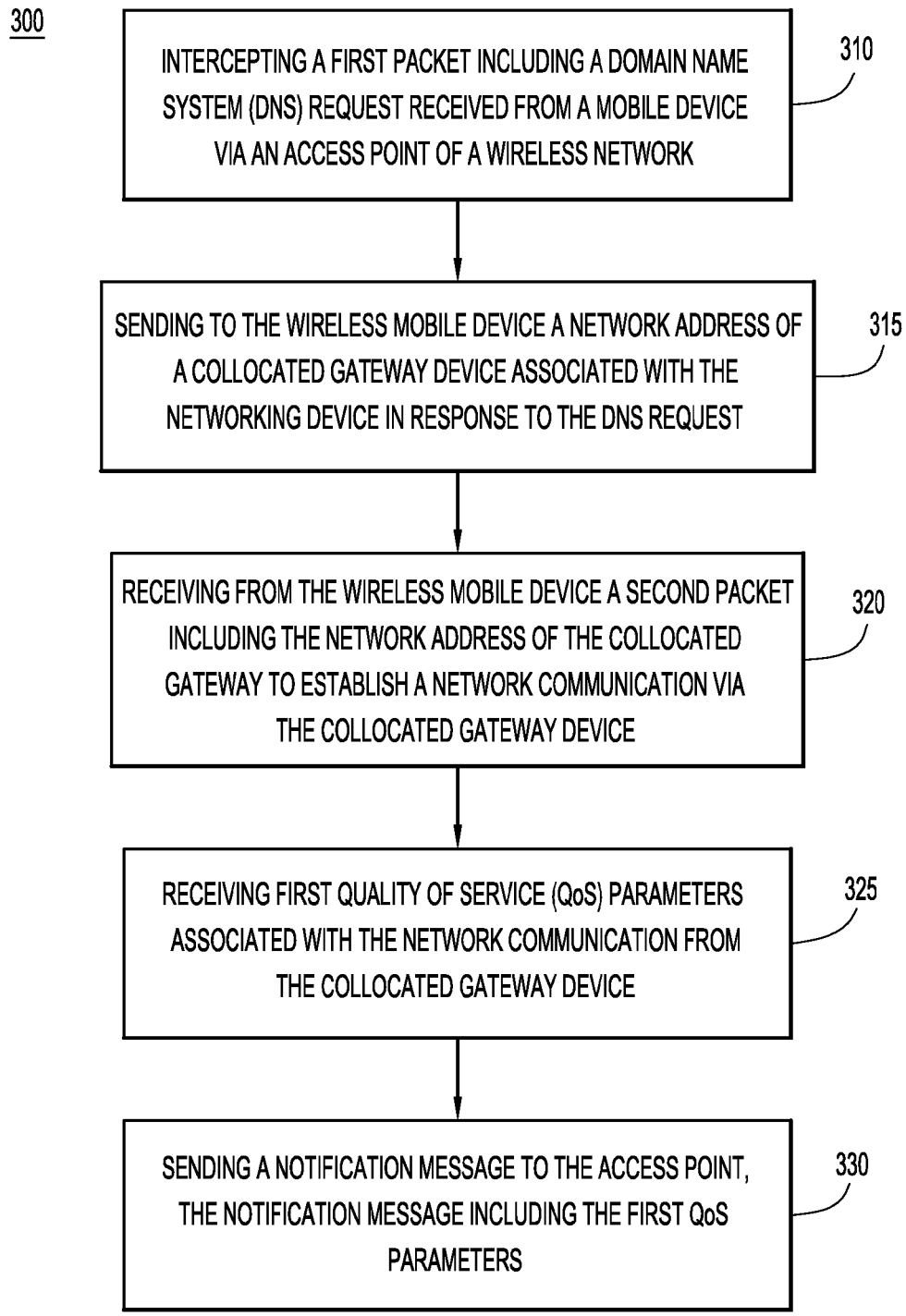
FIG. 3 is a flow chart depicting operations performed by the networking device to ensure QoS for Wi-Fi calling according to an example embodiment.

Reference is now made to FIG. 3 with continued reference to FIGS. 1 and 2. FIG. 3 is a high level flow chart of a method 300 depicting operations performed by QoS logic 126 of the networking device 110 (which corresponds to SaMOG TWAG 210 in FIG. 2) to set up a Wi-Fi call initiated by UE 235. To setup the Wi-Fi call, UE 235 needs to establish a network communication with IMS core 265 that provides the IMS services such as Wi-Fi calling or VoWi-Fi. Method 300 begins at 310 at which a first packet, received from UE 235 via AP/WLC 230 and including a DNS request, is intercepted by SaMOG TWAG 210.

At 315, SaMOG TWAG 210 sends to UE 235 a network address of collocated ePDG 215 associated with SaMOG TWAG 210 in response to the DNS request received from UE 235. At 320, SaMOG TWAG 210 receives a second packet from UE 235 including the network address of collocated ePDG 215 to establish a network communication via collocated ePDG 215.

At 325, SaMOG TWAG 210 receives QoS parameters from collocated ePDG 215. The QoS parameters are associated with the network communication to be established by UE 235 via collocated ePDG 215 and IMS PGW 260 with IMS core 265. At 330, SaMOG TWAG 210 sends a notification message to AP/WLC 230. The notification message includes the QoS parameters received by SaMOG TWAG 210 from collocated ePDG 215 for the network communication to be established by UE 235 via ePDG 215.

End-to-end QoS application to a VoWi-Fi call involves two general parts. First, QoS parameters for a VoWi-Fi call are communicated to AP/WLC 230. Second, AP/WLC 230 performs bandwidth reservation, rate limiting and packet prioritization in accordance with the QoS parameters. While QoS parameters for VoWi-Fi calls are communicated to AP/WLC 230 using signaling messages on a control plane level as described below with reference to FIG. 4, bandwidth reservation, rate limiting and packet prioritization in accordance with the QoS parameters is performed by AP/WLC 230 on a data plane level for each data voice packet.

In a 3GPP LTE network, when UE first connects to a networking system, a default bearer is established between the UE and a PGW. A bearer is a virtual concept that defines how UE data is treated when it travels across a network. Each default bearer is associated with an IP address and provides a best effort service. A UE can have multiple default bearers associated with it for multiple services. One default bearer may be used for signaling messages, such as Session Initiation Protocol (SIP) signaling, and another default bearer may be used for other traffic, such as video, chat, email, browser, etc. Such traffic characteristics are represented by an Access Point Network (APN). In this specific example, one default bearer is used for an Internet APN while the other is for an IMS APN. In addition, a dedicated bearer may be established on top of the default bearer(s) which provides a dedicated tunnel for specific network traffic, such as, for example Voice over IP (VoIP) or video. A dedicated bearer uses Traffic Flow Templates (TFT) to provide the specific treatment to the specific network traffic.

At a high level, a default bearer between UE 235 and Internet PGW 250 is established as follows. UE 235 associates with AP/WLC 230 in accordance with the IEEE 802.11 standard. AP/WLC 230 initiates Extensible Authentication Protocol (EAP) authentication through SaMOG TWAG 210 and AAA server 240. Upon completion of the EAP authentication, SaMOG TWAG 210 obtains an IP address which is forwarded to UE 235 when UE 235 initiates Dynamic Host Configuration Protocol (DHCP) procedures towards AP/WLC 230. At this time, a VoWi-Fi client is started on UE 235 and a DNS query is performed to get an ePDG address. The DNS packet is intercepted by SaMOG TWAG 230 and packets from UE 235 are directed to collocated ePDG 215. UE 235 and ePDG 215 perform regular setup of an Internet Protocol Security (IPsec) tunnel between UE 235 and ePDG 215 which completes the VoWi-Fi call setup.

A detailed sequence of messages exchanged in networking system 200 to establish a default bearer and a dedicated bearer for a VoWi-Fi session is now described with reference to FIG. 4 (with continued reference to FIG. 2). The setup of an Internet default bearer begins at 401. The setup of an IMS default bearer begins at 411. The setup of an IMS dedicated bearer begins at 420.

FIG. 4 shows an exchange of messages 400 on a control plane level between SaMOG TWAG 210, ePDG 215, AP/WLC 230, UE 235, AAA server 240, AAA server 245, Internet PGW 250, and IMS PGW 260 of networking system 200. At 401, UE 235 initiates an association with AP/WLC 230 in accordance with the IEEE 802.11 standard using an SSID provided by the mobile telecommunications service provider. AP/WLC 230 triggers EAP authentication by requesting an EAP Identity from UE 235. UE 235 sends the EAP Identity to AP/WLC 230 and AP/WLC 230 forwards the EAP Identity to SaMOG TWAG 210 in a Remote Authentication Dial-In User Service (RADIUS) Access Request message. RADIUS is a networking protocol that provides centralized Authentication, Authorization, and Accounting (AAA) management for users who connect to and use a network service. SaMOG TWAG 210 forwards the EAP Identity to AAA server 240 via STa interface 270 to initiate authentication in accordance with 3GPP specifications, such as 3GPP specification 29.273. Thereafter, AAA server 240 and UE 235 exchange multiple EAP payloads via SaMOG TWAG 210 and AP/WLC 230 as required by the EAP protocol to perform the authentication.

After AAA server 240 sends an EAP Success message and a subscriber profile (including Internet PGW 250 as a default APN) to SaMOG TWAG 210 at processing stage 401 described above, at processing stage 402, SaMOG TWAG 210 initiates a GTPv2 call setup on s2a interface 275 with Internet PGW 250. Internet PGW 250 allocates an IP address and sends it to SaMOG TWAG 210 in a Create Session Response message. At 403, SaMOG TWAG 210 forwards the EAP Success message in an Access Accept message to AP/WLC 230, and at 404, AP/WLC 230 sends the EAP Success message to UE 235 to complete the authentication process.

At 405, UE 235 initiates a DHCP procedure and sends a DHCP Discover message to AP/WLC 230. AP/WLC 230 maps this DHCP request to a PMIPv6 Proxy Binding Update (PBU) request and sends the request to SaMOG TWAG 210. SaMOG TWAG 210 responds with a PMIPv6 Proxy Binding Acknowledgement (PBA) message and sends the IP address assigned by Internet PGW 250 at processing step 402 to AP/WLC 230. AP/WLC 230 responds to the DHCP Discover message and sends a DHCP Offer message to UE 235. Still at processing stage 405, UE 235 sends a DHCP Request message to AP/WLC 230 and receives the IP address from AP/WLC 230 in a DHCP Acknowledgement message.

At 406, a Wi-Fi Calling application is started on UE 235 and UE 235 sends a DNS Query message for an ePDG Fully Qualified Domain Name (FQDN) to AP/WLC 230. At processing stage 407, the DNS Query message is routed by AP/WLC 230 to SaMOG TWAG 210 via a GRE tunnel as a data packet. GRE is a tunneling protocol that can encapsulate a wide variety network layer protocols inside virtual point-to-point links over an Internet Protocol network.

At 408, SaMOG TWAG 210 snoops or intercepts the DNS Query message. At this processing stage, instead of forwarding the DNS Query message to a DNS server, SaMOG TWAG 210 generates a DNS Query Response message including an IP address of collocated ePDG 215. At 409, the DNS Query Response message generated by SaMOG TWAG 210 with the IP address of collocated ePDG 215 is sent to AP/WLC 230 over the GRE tunnel and at processing stage 410, AP/WLC 230 sends the DNS Query Response message to UE 235 with the collocated ePDG's IP address as the selected ePDG.

At 411, UE 235 initiates an Internet Key Exchange (IKEv2) procedure by sending an IKE INIT message to towards ePDG 215 to set up an IPsec tunnel between UE 235 and ePDG 215. UE 235 and ePDG 215 use IKEv2 to establish an IPSec security association (SA) for the tunnel. AP/WLC 230 receives the IKE INIT message and sends it to SaMOG TWAG 210 via the GRE tunnel. Based on a configured access control list (ACL), SaMOG TWAG 210 redirects all data packets to collocated ePDG 215 residing in the same chassis or on the same line card. The response from ePDG 215 is received by SaMOG TWAG 210 and relayed to AP/WLC 230 over the GRE tunnel, which in turn is send in IEEE 802.11 data frames to UE 235 from AP/WLC 230 and UE 235 and ePDG 215 complete the authentication. After successful authentication, UE 235 sends an IKE_AUTH message to ePDG 215 to inform ePDG 215 about its IP address.

At 412, ePDG 215 sets up a GTPv2 session on s2b interface 280 towards IMS PGW 260. IMS PGW 260 allocates an IP address for UE 235 and sends the IP address in a Create Session Response message along with QoS parameters associated with a default bearer of an IMS packet data network (PDN) connection. At 413, ePDG 215 includes the IP address for UE 235 in an IKE_AUTH message and sends the IKE_AUTH message to SaMOG TWAG 210 which is forwarded at 414 by SaMOG TWAG 210 to AP/WLC 230 over the GRE tunnel. At 415, AP/WLC 230 sends the IKE_AUTH message to UE 235 in IEEE 802.11 frames and completes the IPsec tunnel setup between UE 235 and ePDG 215.

At 416, collocated ePDG 215 sends the QoS parameters associated with the default bearer of the IMS PDN connection, and the Security Parameter Index (SPI) internally used for the IPsec security association with the SaMOG TWAG 210.

At 417, SaMOG TWAG 210 builds a PMIPv6 Update Notification (UPN) message in accordance with Request for Comments (RFC) 7077 of IETF and includes into the UPN message a Differentiated Services Code Point (DSCP) value, an Aggregate Maximum Downlink Bit Rate, an Aggregate Maximum Uplink Bit Rate, and a QoS Traffic Selector option. The SPI and the traffic selectors received from ePDG 215 at processing stage 416 are included in the QoS Traffic Selector option.

At 418, AP/WLC 230 exchanges Add Traffic Stream (ADDTS) Requests and Response with UE 235 in accordance with the IEEE 802.11-2012 specification to pass on the traffic selector (TS) information along with the QoS parameters to UE 235. At 417, AP/WLC 230 maps the DSCP value received in the UPN message from SaMOG TWAG 210 to the appropriate User Priority in the 802.11 add traffic stream (ADDTS) request.

At 419, AP/WLC 230 sends an Update Notification Acknowledgement (UPA) message to SaMOG TWAG 210 indicating successful IEEE 802.11 procedure. This completes the setup of a default bearer for the VoWi-Fi call between UE 235 and IMS PGW 260.

At 420, IMS PGW 260 triggers creation of a dedicated bearer between IMS PGW 260 and EU 235 by sending a GTPv2 Create Bearer Request message with TFTs and QoS parameters for this dedicated bearer to ePDG 215.

An example of a GTPv2 Create Bearer Request message that includes a sample TFT and sample QoS parameters is shown in Table 1:

TABLE 1

GTPv2 Create Bearer Request message

<<<<OUTBOUND 14:20:24:184 Eventid:141005(3)
[PGW-S5/S2a/S2bjGTPv2C Tx PDU, from 2002::2:101:30496
To 2002::2:61:2123 (187)
TEID: 0x50010001, Message type:
EGTP_CREATE_BEARER_REQUEST (0x5F)
Sequence Number: 0x00201F (8223)
GTP HEADER
    Version number: 2
    TEID flag: Present
    Piggybacking flag: Not present
    Message Length: 0x00B7 (183)
INFORMATION ELEMENTS
    EPS BEARER ID:
        Value: 5
    BEARER CONTEXT: #1
        Value:
            EPS BEARER ID:
                Value: 0
            BEARER TFT:
                Value:
                      Opcode: Create New TFT
                      TFT Packet Filters: 1
                      Filter Dir: 3 (Bi-directional)
                      Filter ID.: 0
                      Eval Prec: 32
                      Pkt Filter Contents Len: 5
                      Components:
                          Proto/nxt header: 6 (TCP)
                          Remote port: 1001
            PGW-DATA FTEID:
                Value:
                      Interface: PGW S5/S8-U
                      IPv4 Flag: 1
                      IPv6 Flag: 1
                      Teid: 0x8002001F
                      IPV4 Addr: 20.20.20.101
                      IPV6 Addr: 2002::2:101
            BEARER QOS:
                Value:
                      ARP: PCI = 0 (Enabled), PL = 1,
                      PVI = 0 (Enabled)
                      QCI: 1
                      Uplnk MBR: 256 kbps
                      Dnlnk MBR: 256 kbps
                      Uplnk GBR: 128 kbps
                      Dnlnk GBR: 128 kbps
    CHARGING ID:
        Value: 0x0A000006

In the GTPv2 Create Bearer Request message shown in Table 1, a new dedicated bearer is requested for a voice call (indicated by QoS Class Identifier (QCI)=1), a maximum guaranteed bitrate (MBR) for uplink and downlink traffic of 256 kbps and a guaranteed bit rate (BGR) for uplink and downlink traffic of 128 kbps. The ePDG 215 processes this GTPv2 Create Bearer Request message and sends a Create Bearer Response message to IMS PGW 260.

At 421, ePDG 215 triggers creation of a child IPSec Service Association (SA) to establish an IPSec tunnel between UE 235 and ePDG 215. During this process, ePDG 215 stores the SPI for the new IPSec SA. To create the child IPSec SA, ePDG 215 sends a CREATE_CHILD_SA message to UE 235 via SaMOG TWAG 210 and AP/WLC 230. UE 235 responds with a CREATE_CHILD_SA message to confirm creation of child SA.

At 422, collocated ePDG 215 sends the QoS parameters associated with the dedicated bearer and the SPI used for the IPsec child SA security association to SaMOG TWAG 210 using internal packet routing protocol 225. The information includes the SPI of the new IPSec child SA, QCI, MBR and GBR values received with the GTPv2 Create Bearer Request message. The ePDG 215 has a mapping table to map QCI and DSCP values. In the example of the GTPv2 Create Bearer Request message of Table 1, the applicable DSCP value for QCI=1 would be "Expedited Forwarding (EF)" which is indicated by DSCP value 46. In addition, the information sent by ePDG 215 to SaMOG TWAG 210 the ePDG's IPSec/IKEv2 tunnel endpoint address.

At 423, SaMOG TWAG 210 builds a PMIPv6 Update Notification message (UPN) in accordance with RFC 7077 of IETF, encodes the data received from ePDG 215 at 422, and includes the encoded data into the UPN message. The encoded data includes a DSCP value, an Aggregate Maximum Downlink Bit Rate, an Aggregate Maximum Uplink Bit Rate, a Guaranteed Downlink Bit Rate, and QoS Traffic Selector options. The SPI and the traffic selectors received from ePDG 215 at 422 are included in the QoS Traffic Selector option.

In the example of the GTPv2 Create Bearer Request message shown in Table 1, the data received from ePDG 215 at 422 is encoded as follows:

The Aggregate Maximum Uplink Bit Rate and Aggregate Maximum Downlink Bit Rate options are added with a value of 256000 in the following format:

| Type | Length | Reserved |
|---|---|---|
| Aggregate-Max_DL/UL-Bit-Rate | | |

The Guaranteed Downlink Bit Rate and Guaranteed Downlink Bit Rate options are sent with a value of 128000 (in bytes) in the following format:

| Type | Length | Reserved |
|---|---|---|
| Guaranteed-DL/UL-Bit-Rate | | |

The SPI and DSCP values are included in the QoS Traffic Selector option in the following format:

| Type | Length | Reserved | TS Format |
|---|---|---|---|
| Traffic Selector | | | |

The QoS Traffic Selector Option is encoded in accordance with RFC 6088 in the following format:

| Sub-opt Type | Sub-Opt Len | TS Format | Reserved |
|---|---|---|---|
| A B C D E F | G H I J K L M | N | Reserved |
| | (A) Start Source Address | | |
| | (B) End Source Address | | |
| | (C) Start Destination Address | | |
| | (D) End Destination Address | | |
| | (E) Start IPsec SPI | | |
| | (F) End IPsec SPI | | |
| (G) Start Source Port | | (H) End Source Port | |
| (I) Start Destination Port | | (J) End Destination Port | |
| (K) Start DS | (L) End DS | (M) Start Prot. | (N) End Prot. |

The data received from ePDG 215 at 422 is separately encoded for uplink and downlink and the source and destination addresses are the outer IP address of UE 235 and the IPSec tunnel end point address of ePDG 215. The field "DS" holds the DSCP value 46 received from ePDG 215. The field "Start IPSec SPI" holds the SPI received from ePDG 215.

At 424, upon receiving the UPN from SaMOG TWAG 210, AP/WLC 230 initiates an ADDTS procedure towards UE 235 to add a new traffic selector for the VoWi-Fi call. AP/WLC 230 maps the DSCP value received in the UPN message from SaMOG TWAG 210 to the appropriate User Priority in the IEEE 802.11 ADDTS Request. In this example embodiment, since the received DSCP value is EF 46, the IEEE 802.11 User Priority (UP) assigned to this traffic selector is 6. AP/WLC 230 exchanges ADDTS Requests and Responses with UE 235 in accordance with the IEEE 802.11 specification to pass on the traffic selector information along with the QoS parameters to UE 235.

At 425, AP/WLC 230 sends an UPA message to SaMOG TWAG 210 indicating success of the IEEE 802.11 procedure.

The interaction between UE 235 and AP/WLC 230 in the above call flow is based on the IEEE specification 802.11-2012 and requires UE 235 and AP/WLC 230 to be capable of mapping IEEE 802.11 QoS and PMIPv6 as described above at 418 and 424.

However, if UE 325 and/or AP/WLC 230 are not capable of sending/receiving QoS information as described with regard to FIG. 4, UE 235 and AP/WLC 230 can still utilize a "Reflective QoS" mechanism. This mechanism is also applicable to VoWi-Fi calls.

"Reflective QoS" is described in the 3GPP 23.139 specification (section 6.3) and is used in an example embodiment to achieve end-to-end DSCP marking for a voice call over a fixed broadband network and an ePDG. To utilize "Reflective QoS," UE 235 is configured to copy the downlink packet's DSCP marking to the uplink packets that UE 235 sends to AP/WLC 230. Any DSCP marking done by the VoWi-Fi application executed on UE 235 is overridden when "Reflective QoS" is enabled. During EAP authentication, UE 235 indicates its capability of performing reflective QoS by sending an AT_RQSI_IND attribute in a EAP payload.

The authorization process for "Reflective QoS" is defined in the 3GPP 24.280 specification (section 7.4.2). To enable "Reflective QoS," AAA server 240 must be provisioned to authorize "Reflective QoS." To authorize "Reflective QoS," in response to the AT_RQSI_IND attribute being received in the EAP payload, AAA server 240 sets an AT_RESULT_IND attribute in the EAP payload sent back to UE 235 to indicate authorization of the "Reflective QoS" mechanism.

After "Reflective QoS" is authorized, the QoS parameters received by AP/WLC 230 from SaMOG TWAG 230 in the PMIPv6 UPN message at 424 can still be used by AP/WLC 230 to perform rate limiting of uplink and downlink data.

"Non-QoS" UEs are UEs that support only Wi-Fi calling using a traffic selector as defined in the 3GPP 3GPP 23.402 specification. However, in accordance with another example embodiment described below, QoS can also be guaranteed if UE 235 only supports Wi-Fi calling using a traffic selector. In this case, multiple flows (control traffic, voice or video, etc.) via IMS PGW 260 use the same IPSec tunnel between UE 235 and ePDP 215. As a result, AP/WLC 230 cannot differentiate this traffic, i.e., AP/WLC 230 cannot distinguish between these flows.

To guarantee QoS for a VoWi-Fi call, at the time of dedicated bearer creation, SaMOG TWAG 210 uses internal heuristics to aggregate QoS parameters of both the default and dedicated bearers, and sends corresponding UPN messages towards AP/WLC 230 for SPIs corresponding to the IPSec tunnels. These QoS parameters can be used by AP/WLC 230 for uplink DSCP mapping and rate limiting on its egress side. Downlink DSCP mapping can be achieved by providing preference to the IPSec tunnel data by assigning Transmit Opportunities (TXOPs). TXOP is defined in IEEE 802.11e and used to enhance QoS for WLAN applications through modifications to the Media Access Control (MAC) layer. A TXOP is a bounded time interval during which a station can send as many frames as possible (as long as the duration of the transmissions does not extend beyond the maximum duration of the TXOP).

Referring now to FIGS. 5A-5E. FIGS. 5A-5E illustrate different configurations of a VoWi-Fi data packet transmitted from UE 235 to IMS core 265 thereby illustrating the techniques to guarantee QoS enforcement for uplink packets transmitted between UE 235 and IMS core 265.

When UE 235 has a VoWi-Fi packet to be sent, UE 235 sends a NULL frame defined in the IEEE 802.11-2012 specification including a UP value in accordance with IEEE 802.11 to AP/WLC 230. When AP/WLC 230 receives the NULL frame, AP/WLC 230 matches the UP value with a DSCP value, an uplink MBR value and an uplink GBR value. As discussed above with regard to step 424 in FIG. 4, AP/WLC 230 matches a UP value of 6 with a DSCP EP value of 46 and sets an uplink MBR to 256 kbps and an uplink GBR to 128 kbps. Based on these values, the AP/WLC 230 applies rate limiting policies and denies transmission time to packets received from UE 235 when the uplink MBR is already exceeded. Otherwise, AP/WLC 230 may allocate transmission time to packets received from UE 235 with a specific TS identifier.

Figure 5A:
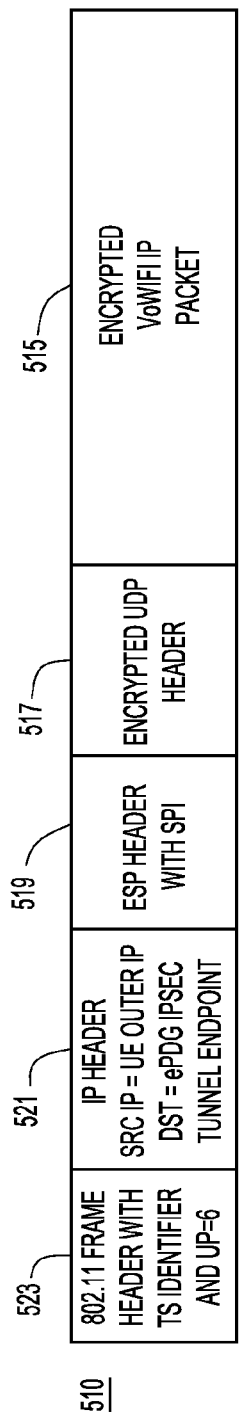
FIG. 5A is a diagram illustrating an uplink packet transmitted from user equipment (UE) to an access point/wireless local area network (LAN) controller (AP/WLC) and which uplink packet includes an encrypted VoWi-Fi packet according to an example embodiment.

FIG. 5A illustrates a packet 510 that is sent from UE 235 to AP/WLC 230 and includes an encrypted VoWi-Fi packet 515. Packet 510 further includes encrypted UDP header 517, Encapsulating Security Payload (ESP) header 519 which includes a SPI for IPSec SA, IP header 521 and IEEE 802.11 frame header 523. IP header 521 contains the outer IP address of UE 235 as a source IP address and the IPSec tunnel endpoint address of ePDG 215 as the destination IP address. IEEE 802.11 frame 523 includes a TS identifier and the UP value is 6.

Figure 5B:
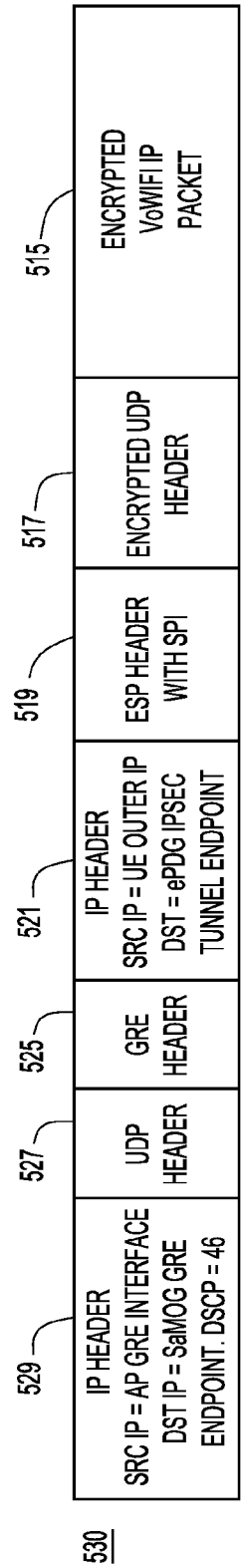
FIG. 5B is a diagram illustrating an uplink packet which is forwarded from the AP/WLC to a S2a Mobility based on GTP (SaMOG) trusted WLAN access gateway (TWAG) according to an example embodiment.

FIG. 5B illustrates a packet 530 which is forwarded from AP/WLC 230 to SaMOG TWAG 210. When AP/WLC 230 receives packet 510, AP/WLC 230 strips off IEEE 802.11 header 523 and encapsulates the remaining packet to be transmitted via a GRE tunnel between AP/WLC 230 and SaMOG TWAG 210. Packet 530 includes encrypted VoWi-Fi packet 515, encrypted UDP header 517, ESP header 519 which includes a SPI for IPSec SA, and IP header 521. In addition, packet 530 includes GRE header 525, UDP header 527 and IP header 529. AP/WLC 230 inserts DSCP value 46 into the outermost IP header 529 to ensure that all intermediate routers (not shown) between AP/WLC 230 and SaMOG TWAG 210 give priority to packet 530 in compliance with the DSCP value set to EF 46.

FIG. 5C illustrates a packet 550 which is forwarded from SaMOG TWAG 210 to ePDG 215. Packet 550 includes VoWi-Fi packet 515, encrypted UDP header 517, ESP header 519 which includes a SPI for IPSec SA, and IP header 521. When SaMOG TWAG 210 receives packet 530 from AP/WLC 230, SaMOG TWAG 210 strips off the outermost IP header 529, the UDP header 527 and the GRE header 525. SaMOG TWAG 210 copies the DSCP value 46 into IP header 521 and forwards packet 550 to ePDG 215 via internal packet routing protocol.

FIG. 5D illustrates a packet 570. Packet 570 is transmitted by ePDG 215 to IMS PGW 260 via GTP interface 280 using the GTPv2 tunneling protocol. Packet 570 includes clear VoWi-Fi data 531, UDP header 533, IP header 535, GTP header 537, UDP header 539 and IP header 541. When ePDG 215 receives packet 550, ePDG 215 removes IP header 521 and ESP header 519 and decrypts VoWi-Fi packet 515 and UDP header 517. Then, ePDG 215 adds to the decrypted clear VoWi-Fi data 531 and decrypted UDP header 533 IP header 535, GTP header 537, UDP header 539, and IP header 541 to form packet 570. In addition, ePDG 215 copies the DSCP value 46 into IP header 541 and forwards packet 570 to IMS PDG 260.

FIG. 5E illustrates a VoWi-Fi packet 590 created by IMS PGW 260 and forwarded to IMS core 265. Packet 590 is generated by IMS PGW 260 by stripping off GTP header 537, UDP header 539, and IP header 541. Before VoWi-Fi packet 590 is routed to IMS core 265, IMS PGW 260 copies the DSCP value 46 into IP header 543.

Referring now to FIGS. 6A-6E. FIGS. 6A-6E illustrate different configurations of a VoWi-Fi data packet transmitted from IMS core 265 to UE 235 thereby illustrating the techniques to guarantee QoS enforcement for downlink packets transmitted between UE 235 and IMS core 265.

Figure 6B:
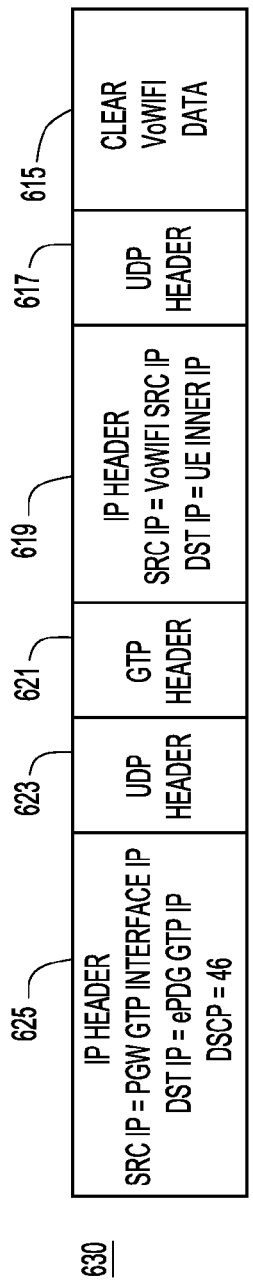
FIG. 6B is a diagram illustrating a downlink packet forwarded by the IMS PGW to the ePDG according to an example embodiment.

FIG. 6A illustrates VoWi-Fi packet 610 received by IMS PGW 260 from IMS core 265. Packet 610 includes clear VoWi-Fi data 615, UDP header 617 and IP header 619. Based on the TFT value in IP header 619, IMS PGW identifies packet 610 as a packet of a VoWi-Fi call. A DSCP value may or may not be set for packet 610 in IP header 619. IMS PGW 260 adds GTP header 621, UDP header 623 and IP header 625 to packet 610 thereby creating packet 630 depicted in FIG. 6B which is forwarded by IMS PGW 260 to ePDG 215. If IP header 619 of packet 610 includes a DSCP value, IMS PGW 260 copies the DSCP value (e.g., DSCP value EF 46) from IP header 619 to IP header 625. If IP header 619 does not include a DSCP value, IMS PGW 260 sets the DSCP value in IP header 625 to EF 46 based on its QCI to DSCP mapping table.

Figure 6C:
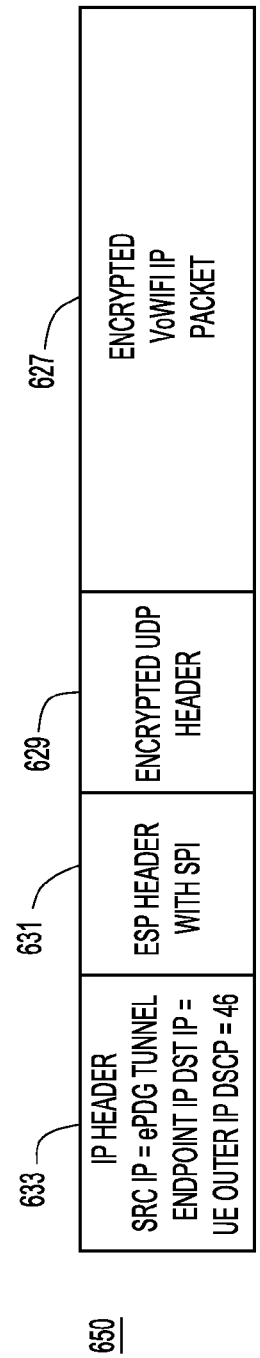
FIG. 6C is a diagram illustrating a downlink packet generated by the ePDG and forwarded to the SaMOG TWAG according to an example embodiment.

When ePDG 215 receives packet 630, ePDG 215 removes GTP header 621, UDP header 623 and IP header 625 from packet 630, and encrypts clear VoWi-Fi data 615 and UDP header 617 to form packet 650 depicted in FIG. 6C. Packet 650 includes encrypted VoWi-Fi IP packet 627 and encrypted UDP header 629. In addition, ePDG 215 adds ESP header 631 and IP header 633 before packet 650 is forwarded by ePDG 215 to UE 235 on the IPSec tunnel via SaMOG TWAG 210. To guarantee the QoS enforcement, ePDG 215 copies the DSCP value from IP header 625 to IP header 633.

Figure 6D:
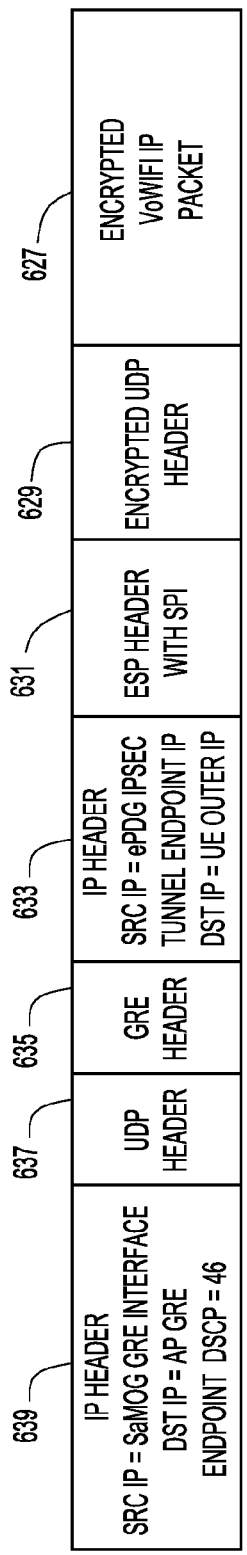
FIG. 6D is a diagram illustrating a downlink packet forwarded by the SaMOG TWAG to the AP/WLC via a Generic Routing Encapsulation (GRE) tunnel according to an example embodiment.
Figure 6E:
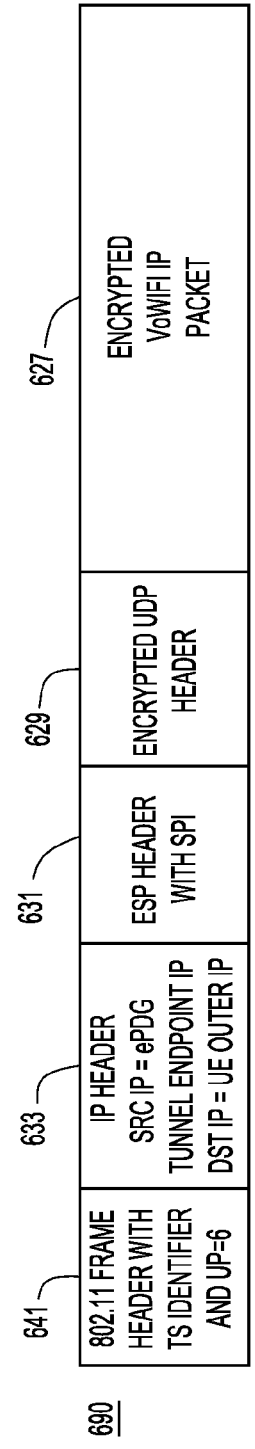
FIG. 6E is a diagram illustrating a downlink packet created by the AP/WLC and forwarded to a UE according to an example embodiment.

FIG. 6D shows packet 670 which is forwarded by SaMOG TWAG 210 to AP/WLC 230 via the GRE tunnel between SaMOG TWAG 210 and AP/WLC 230. As shown in FIG. 6D, to form packet 670, SaMOG TWAG 210 adds GRE header 635, UDP header 637 and IP header 639 to packet 650. In addition, SaMOG TWAG 210 copies the DSCP value from IP header 633 to outermost IP header 639. AP/WLC 230 strips off GRE header 635, UDP header 637 and IP header 639. Based on the SPI value in IP header 633, AP/WLC 230 looks up corresponding IEEE 802.11 QoS parameters based on which AP/WLC 230 performs rate limiting if the downlink MBR of 256 kbps has been exhausted. AP/WLC 230 sends a NULL frame to UE 235 on the IEEE 802.11 TS for the corresponding bearer, adds IEEE 802.11 frame header 641 to stripped packet 670, thereby forming packet 690. In addition, AP/WLC 230 sets the UP value in IEEE 802.11 frame 641 to 6 and forward packet 690 to EU 235.

In summary, an end-to-end QoS mechanism for Wi-Fi calling and IMS services over carrier Wi-Fi network is provided. SaMOG TWAG 230 intercepts a DNS Request received from UE 235. Based on an operator policy, for selected sessions, SaMOG TWAG 230 directly responds to the DNS Request with a network address of collocated ePDG 215 instead of forwarding this request to a DNS server which might load balance ePDG nodes.

SaMOG TWAG 230 and/or ePDG 215 converts ePDG Uplink/Downlink TFTs corresponding to a dedicated bearer (received on S2b interface 280) to IPSec Child SA traffic selectors (SPI, ePDG IP Address, UE IPSec Tunnel address). This is needed because dedicated bearer's UL/TL TFTs are seen only by UE 235 and used for inner IP payload. Since data is encrypted in the IPSec tunnel, AP/WLC 230 can access only IPSec related traffic selectors. SaMOG TWAG 230 sends IPSec traffic based templates to AP/WLC 230 in the QoS-Traffic-Selector Option on the PMIPv6 interface. This messaging is triggered as a result of dedicated bearer creation on ePDG 215. For downlink packets received from collocated ePDG 215, SaMOG TWAG 210 copies the DSCP marking in the outer IP Header of the ESP payload to the respective PMIP GRE tunnel's outer IP Header between SaMOG TWAG 210 and AP/WLC 230. For other traffic, SaMOG TWAG 210 uses local configuration to convert QCI parameters to DSCP parameters corresponding to the respective PDN connection.

In one form, a method is provided comprising: at a networking device, intercepting a first packet including a Domain Name System (DNS) request received from a wireless mobile device via an access point of a wireless network, sending to the wireless mobile device a network address of a collocated gateway device associated with the networking device in response to the DNS request, receiving from the wireless mobile device a second packet including the network address of the collocated gateway to establish a network communication via the collocated gateway device, receiving first Quality of Service (QoS) parameters associated with the network communication from the collocated gateway device, and sending a notification message to the access point, the notification message including the first QoS parameters.

In another form, an apparatus is provided comprising: one or more processors, one or more memory devices in communication with the one or more processors; and at least one network interface unit coupled to the one or more processors, wherein the one or more processors are configured to: intercept a first packet including a DNS request received from a wireless mobile device via an access point of a wireless network, send to the wireless mobile device a network address of a collocated gateway device associated with the networking device in response to the DNS request, receive from the wireless mobile device a second packet including the network address of the collocated gateway to establish a network communication via the collocated gateway device, receive first Quality of Service (QoS) parameters associated with the network communication from the collocated gateway device; and send a notification message to the access point, the notification message including the first QoS parameters.

In still another form, one or more computer readable non-transitory storage media are provided encoded with software comprising computer executable instructions that when executed by one or more processors cause the one or more processor to: intercept a first packet including a DNS request received from a wireless mobile device via an access point of a wireless network, send to the wireless mobile device a network address of a collocated gateway device associated with the networking device in response to the DNS request, receive from the wireless mobile device a second packet including the network address of the collocated gateway to establish a network communication via the collocated gateway device, receive first Quality of Service (QoS) parameters associated with the network communication from the collocated gateway device, and send a notification message to the access point, the notification message including the first QoS parameters.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a networking device, intercepting a first packet including a Domain Name System (DNS) request received from a wireless mobile device via an access point of a wireless network;
   sending to the wireless mobile device a network address of a collocated gateway device associated with the networking device in response to the DNS request;
   receiving from the wireless mobile device a second packet including the network address of the collocated gateway to establish a network communication via the collocated gateway device;
   receiving first Quality of Service (QoS) parameters associated with the network communication from the collocated gateway device;
   sending a notification message to the access point, the notification message including the first QoS parameters;
   converting the first QoS parameters into second QoS parameters;
   forwarding the second QoS parameters to the access point to be forwarded by the access point to the wireless mobile device;
   guaranteeing a first QoS for packets exchanged between the access point and the networking device in accordance with the first QoS parameters;
   guaranteeing a second QoS for packets exchanged between the access point and the wireless mobile device in accordance with the second QoS parameters; and
   receiving an encrypted third packet from the wireless mobile device via the access point with an outer header including the first QoS parameters;

removing the outer header from the encrypted third packet and copying the first QoS parameters to an inner header of the encrypted third packet; and forwarding the encrypted third packet with the first QoS parameters in the inner header and without the outer header to the collocated gateway device.

2. The method of claim 1, wherein the network communication is a multimedia communication.

3. The method of claim 1,
wherein the first QoS parameters and the second QoS parameters are configured to support WiFi calling using the wireless mobile device.

4. The method of claim 1, further comprising:
determining aggregate QoS parameters based on the first QoS parameters and the second QoS parameters.

5. The method of claim 1, further comprising:
receiving a data packet at the collocated gateway device including unencrypted data;
encrypting at least the unencrypted data and copying the second QoS parameters to an outer header of the data packet; and
forwarding the data packet with the second QoS parameters in the outer header to the wireless mobile device.

6. The method of claim 1, wherein the first QoS parameters include a differentiated services code point (DSCP) value, and
wherein the second QoS parameters comprise:
an aggregate maximum downlink bit rate;
an aggregate maximum uplink bit rate; and
QoS traffic selector options.

7. The method of claim 1, further comprising:
receiving an encrypted fourth packet from the gateway device including third QoS parameters;
adding an outer header to the encrypted fourth packet;
copying the third QoS parameters to the outer header; and
forwarding the encrypted fourth packet with the outer header including the third QoS parameters to the access point.

8. An apparatus comprising:
one or more processors;
one or more memory devices in communication with the one or more processors; and
at least one network interface unit coupled to the one or more processors,
wherein the one or more processors are configured to:
intercept a first packet including a Domain Name System (DNS) request received from a wireless mobile device via an access point of a wireless network;
send to the wireless mobile device a network address of a collocated gateway device associated with the at least one network interface unit in response to the DNS request;
receive from the wireless mobile device a second packet including the network address of the collocated gateway to establish a network communication via the collocated gateway device;
receive first Quality of Service (QoS) parameters associated with the network communication from the collocated gateway device;
send a notification message to the access point, the notification message including the first QoS parameters;
convert the first QoS parameters into second QoS parameters;

forward the second QoS parameters to the access point to be forwarded by the access point to the wireless mobile device;
guarantee a first QoS for packets exchanged between the access point and the at least one network interface unit in accordance with the first QoS parameters;
guarantee a second QoS for packets exchanged between the access point and the wireless mobile device in accordance with the second QoS parameters; and
receive an encrypted third packet from the wireless mobile device via the access point with an outer header including the first QoS parameters;
remove the outer header from the encrypted third packet and copying the first QoS parameters to an inner header of the encrypted third packet; and
forward the encrypted third packet with the first QoS parameters in the inner header and without the outer header to the collocated gateway device.

9. The apparatus of claim 8, wherein the network communication is a multimedia communication.

10. The apparatus of claim 8,
wherein the first QoS parameters and the second QoS parameters are configured to support WiFi calling using the wireless mobile device.

11. The apparatus of claim 8, wherein the one or more processors are configured to:
determine aggregate QoS parameters based on the first QoS parameters and the second QoS parameters.

12. The apparatus of claim 8, wherein the one or more processors are configured to:
receive a data packet at the collocated gateway device including unencrypted data;
encrypt at least the unencrypted data and copying the second QoS parameters to an outer header of the data packet; and
forward the data packet with the second QoS parameters in the outer header to the wireless mobile device.

13. The apparatus of claim 8, wherein the first QoS parameters include a differentiated services code point (DSCP) value, and
wherein the second QoS parameters comprise:
an aggregate maximum downlink bit rate;
an aggregate maximum uplink bit rate; and
QoS traffic selector options.

14. The apparatus of claim 8, wherein the one or more processors are configured to:
receive an encrypted fourth packet from the gateway device including third QoS parameters;
add an outer header to the encrypted fourth packet;
copy the third QoS parameters to the outer header; and
forward the encrypted fourth packet with the outer header including the third QoS parameters to the access point.

15. One or more computer readable non-transitory storage media encoded with software comprising computer executable instructions that when executed by one or more processors of a networking device cause the one or more processors to:
intercept a first packet including a domain name system (DNS) request received from a wireless mobile device via an access point of a wireless network;
send to the wireless mobile device a network address of a collocated gateway device associated with the networking device in response to the DNS request;
receive from the wireless mobile device a second packet including the network address of the collocated gateway to establish a network communication via the collocated gateway device;
receive first Quality of Service (QoS) parameters associated with the network communication from the collocated gateway device;
send a notification message to the access point, the notification message including the first QoS parameters;
convert the first QoS parameters into second QoS parameters;
forward the second QoS parameters to the access point to be forwarded by the access point to the wireless mobile device;
guarantee a first QoS for packets exchanged between the access point and the networking device in accordance with the first QoS parameters;
guarantee a second QoS for packets exchanged between the access point and the wireless mobile device in accordance with the second QoS parameters; and
receive an encrypted third packet from the wireless mobile device via the access point with an outer header including the first QoS parameters;
remove the outer header from the encrypted third packet and copying the first QoS parameters to an inner header of the encrypted third packet; and
forward the encrypted third packet with the first QoS parameters in the inner header and without the outer header to the collocated gateway device.

16. The computer readable non-transitory storage media of claim 15, wherein the network communication is a multimedia communication.

17. The computer readable non-transitory storage media of claim 15, wherein the first QoS parameters and the second QoS parameters are configured to support WiFi calling using the wireless mobile device.

18. The computer readable non-transitory storage media of claim 15,
wherein the first QoS parameters include a differentiated services code point (DSCP) value, and
wherein the second QoS parameters comprise:
an aggregate maximum downlink bit rate;
an aggregate maximum uplink bit rate; and
QoS traffic selector options.

19. The computer readable non-transitory storage media of claim 15, wherein the executable instructions further cause the one or more processors to:
receive a data packet at the collocated gateway device including unencrypted data;
encrypt at least the unencrypted data and copying the second QoS parameters to an outer header of the data packet; and
forward the data packet with the second QoS parameters in the outer header to the wireless mobile device.

20. The computer readable non-transitory storage media of claim 15, wherein the executable instructions further cause the one or more processors to:
receive an encrypted fourth packet from the gateway device including third QoS parameters;
add an outer header to the encrypted fourth packet;
copy the third QoS parameters to the outer header; and
forward the encrypted fourth packet with the outer header including the third QoS parameters to the access point.

* * * * *